United States Patent [19]

Heins et al.

[11] 4,440,895

[45] Apr. 3, 1984

[54] SYNTHETIC RUBBER DISPERSIONS CONTAINING CARBOXYL GROUPS, A PROCESS FOR THEIR PREPARATION AND THEIR USE

[75] Inventors: Ferdinand Heins, Monheim-Baumberg; Martin Matner, Odenthal; Hellmut Striegler, Leverkusen, all of Fed. Rep. of Germany

[73] Assignee: Bayer Aktiengesellschaft, Leverkusen-Bayerwerk, Fed. Rep. of Germany

[21] Appl. No.: 327,601

[22] Filed: Dec. 4, 1981

[30] Foreign Application Priority Data

Dec. 13, 1980 [DE] Fed. Rep. of Germany ....... 3047084

[51] Int. Cl.$^3$ ................ C08F 212/10; C08F 212/34; C08L 0/00
[52] U.S. Cl. .................................... 524/822; 524/156; 524/157; 524/166; 524/421; 524/423; 524/565; 524/575; 524/599; 524/745; 524/787; 524/796; 524/821; 526/304; 526/317
[58] Field of Search ............... 524/156, 157, 166, 565, 524/575, 599, 421, 423, 745, 787, 796, 821, 822; 526/317, 304

[56] References Cited

U.S. PATENT DOCUMENTS

| | | | |
|---|---|---|---|
| 3,711,437 | 1/1973 | Wielan et al. | 260/29.7 W |
| 3,781,236 | 12/1973 | Bassham et al. | 524/156 |
| 3,793,244 | 2/1974 | Megee et al. | 524/822 |
| 3,795,647 | 3/1974 | Duggan | 524/166 |
| 4,064,081 | 12/1977 | McCoy et al. | 524/822 |
| 4,130,691 | 12/1978 | Canard | 524/575 |
| 4,359,543 | 11/1982 | Hegedus et al. | 524/157 |

*Primary Examiner*—Harry Wong, Jr.
*Attorney, Agent, or Firm*—Connolly and Hutz

[57] ABSTRACT

Synthetic rubber dispersions containing carboxyl groups, free from specks and with little tendency to foaming, with advantages for their technical application contain a copolymer of 0.3 to 1.0 parts by weight of itaconic acid and 99.0 to 99.7 parts by weight of a mixture of 10 to 90 parts by weight of one or more acyclic conjugated dienes having 4 to 9 carbon atoms and 10 to 90 parts by weight of one or more aryl vinyl monomers having 8 to 12 carbon atoms and/or (meth)acrylonitrile, in which the quantity of (meth)acrylonitrile is at most 50 parts by weight and wherein up to 25 parts by weight of the non-dissociating monomers may optionally be replaced by one or more other non-dissociating copolymerizable monomers, which dispersions are stabilized with 0.05 to 0.5% by weight, based on the copolymer, of an anionic emulsifier.

1 Claim, No Drawings

SYNTHETIC RUBBER DISPERSIONS CONTAINING CARBOXYL GROUPS, A PROCESS FOR THEIR PREPARATION AND THEIR USE

The preparation of aqueous synthetic rubber dispersions containing carboxyl groups has been disclosed in U.S. Pat. No. Re. 27,269/3,256,234. Since the salts of the ethylenically-unsaturated carboxylic acids used are barely soluble in the other water insoluble monomers as diolefins and aromatic vinyl compounds in the presence of water, it is known to carry out the process at low pH values, in the region of pH 5 to 2.

At these pH values, however, the choice of suitable emulsifiers is limited, basically to anionic emulsifiers in which the underlying acids have a high dissociation constant. In the above mentioned U.S.-Reissue Patent, the quantity of emulsifier added is 4% by weight, based on the monomers.

A similar procedure is disclosed in British Pat. No. 1,072,694, in which copolymerisation is carried out at pH values below 7 and then the pH is raised above 7 after polymerisation. The quantity of emulsifier used in this case is 5% by weight, based on the monomers.

Neutralization or adjustment of the pH to a value above 7 is necessary because otherwise corrosion is liable to occur in the machines used for the process. Neutralization causes a sharp drop in the surface tension of the latices containing carboxyl groups. The lowering of surface tension, however, considerably increases the tendency of the latices to foam, so that considerable difficulties are liable to occur when working with such latices, especially in machines operating at high speeds.

Various methods have been proposed to avoid the undesirable tendency to foaming and to obtain stable latices as far as possible free from coagulate and specks and, thirdly, for economical reasons to keep the quantity of ethylenically-unsaturated carboxylic acids as small as possible. According to German Auslegeschrift No. 1,814,209, synthetic rubber dispersions with a high surface tension are prepared from 74.5 to 20% by weight of diolefins, 25.0 to 70% by weight of styrene optionally replaced partly or completely by other non-dissociating mono-olefins, and 0.5 to 10% by weight of mono-ethylenically unsaturated carboxylic acids in the presence of 0.025 to 0.1% by weight of an emulsifier of the sulphonate type and 0.5 to 3% by weight of a polyethylene glycol as well as small quantities of an iron salt. Although these latices contain little coagulate or specks, do not foam in the course of processing and require only small quantities of ethylenically-unsaturated carboxylic acids, the addition of the required iron has an unfavourable effect on ageing of films produced from these dispersions and, owing to the addition of polyethylene glycol, these films are so hydrophilic that they are unsuitable for certain applications, such as the impregnation of needle felt floor coverings.

According to U.S. Pat. No. 3,575,913, latices with improved pigment stability suitable for coating paper are obtained by introducing from 0.5 to 2.5% by weight of a monoethylenically unsaturated dicarboxylic acid into a reaction zone, adding the bulk of monomers consisting of aryl vinyl monomers such as styrene and a conjugated diene such as butadiene-(1,3), polymerising until at least ca. 90% of the monomer content has been converted, using, for example, a peroxodisulphate initiator, and then adding 1 to 5% by weight of an acrylic acid and polymerising at temperatures of 70° to 100° C. until the monomer conversion is at least 98%. This process uses comparatively large quantities of unsaturated mono and di-carboxylic acids, among which itaconic acid is also mentioned. Polymerisation is carried out with the addition of anionic emulsifiers.

According to U.S. Pat. No. 3,324,066, carboxylated synthetic rubber dispersions containing 1 to 10% by weight of at least one mono-ethylenically unsaturated carboxylic acid are prepared by a complicated method using more than 1% by weight, based on the total quantity of monomers, of an anionic dispersing agent. Where itaconic acid is used, it is mixed with other unsaturated acids, and the acid concentration, based on the total monomer concentration, is 4%.

According to German Offenlegungsschrift No. 24 18 419, low foaming latices free from specks are obtained by the polymerisation of 73.5 to 18.5 parts by weight of butadiene, 20 to 80 parts by weight of styrene, 0 to 10 parts by weight of acrylonitrile, 0 to 5 parts by weight of ethylenically-unsaturated carboxylic acid amides or their methylol derivatives and 1.5 to 10 parts by weight of ethylenically-unsaturated carboxylic acids in aqueous emulsion in the presence of a radical forming initiator and of an emulsifier if the ethylenically-unsaturated carboxylic acids consist of a mixture of 1.0 to 4 parts by weight of acrylic acid and 0.5 to 6 parts by weight of methacrylic acid and the emulsifier is an anionic emulsifier used in a quantity of less than 0.5 parts by weight, based on the total quantity of monomers.

It has now been found that synthetic rubber dispersions containing carboxyl groups can be obtained free from specks and with little tendency to foaming, with advantages for their technical application, by a method using the least possible quantity of ethylenically-unsaturated carboxylic acid, if the ethylenically-unsaturated carboxylic acid used is itaconic acid.

This invention therefore provides aqueous carboxylated synthetic rubber dispersions containing a copolymer of 0.3 to 1.0 parts by weight of itaconic acid and 99.0 to 99.7 parts by weight of a mixture of 10 to 90 parts by weight of one or more acyclic conjugated dienes having 4 to 9 carbon atoms and 10 to 90 parts by weight of one or more aryl vinyl monomers having 8 to 12 carbon atoms or a mixture of the vinyl monomers and 0 to 50 parts by weight of (meth)acrylonitrile and up to 25 parts by weight of the non-dissociating monomers may be replaced by one or more other non-dissociating copolymerisable monomers, which dispersions are stabilized by 0.05 to 0.5% by weight, based on the copolymer, of an anionic emulsifier.

The invention also provides a process for the preparation of the above mentioned carboxylated synthetic rubber dispersions, characterised in that using a reactor with a stirrer operated batch-wise, part of the water, part or preferably all of the itaconic acid, a base, all or part of the anionic emulsifier and part of the monomers are introduced into the reactor in proportions such that the pH of the stirred mixture is from 3.5 to 6.0, polymerisation is initiated at a temperature of at least 70° C. by the addition of a part of 0.5 to 1.5% by weight, based on the total quantity of monomers, of an ammonium and/or alkali metal peroxodisulphate, and at least one nonaqueous stream of the other monomers and at least one aqueous stream containing the remainder of ammonium peroxodisulphate and/or alkali metal peroxodisulphate are introduced continuously while the contents of the reactor are maintained at 75° to 150° C. until the monomers have been almost completely converted.

It is surprisingly found that the synthetic rubber dispersions prepared according to the invention are free from coagulum in spite of their low emulsifier and carboxylic acid content and that they have an extremely high mechanical stability after the pH has been adjusted to an alkaline level. Owing to their high surface tension, even after adjustment to an alkaline pH, the dispersions are particularly easily worked up and they are also characterised by having excellent adherence to whatever substrate is used. The dispersions are preferably free from polyalkylene glycols.

The process according to the invention may optionally be modified so that, after initiation, a certain interval of time is allowed to elapse to enable a seed latex to develop before commencing the continuous addition of the nonaqueous and aqueous streams.

The following are examples of suitable acyclic conjugated dienes having 4 to 9 carbon atoms: butadiene-(1,3), 2-methyl-butadiene-(1,3) (isoprene), 2,3-dimethyl butadiene-(1,3), piperylene, 2-neopentyl-butadiene-(1,3) and other substituted dienes, such as 2-chlorobutadiene-(1,3) (chloroprene), 2-cyanobutadiene-(1,3) and substituted straight chain conjugated pentadienes and straight chain or branch chain hexadienes. Butadiene-(1,3) is the preferred monomer on account of the particular facility with which it is capable of copolymerising with aryl vinyl monomers and (meth)acrylonitrile.

Those aryl vinyl monomers in which the vinyl group, optionally alkyl-substituted in the α-position, is directly attached to an aromatic nucleus containing 6 to 10 carbon atoms are suitable. The following are examples: styrene and substituted styrenes such as 4-methyl styrene, 3-methyl styrene, 2,4-dimethyl styrene, 2,4-diethyl styrene, 4-isopropyl styrene, 4-chlorostyrene, 2,4-dichlorostyrene, divinyl benzene, α-methyl-styrene and vinyl naphthalene. Styrene is the preferred monomer due to its accessibility and the facility with which it copolymerises, particularly with butadiene-(1,3).

As already mentioned above, up to 25 parts by weight of the non-dissociating monomers may be replaced by one or more monomers capable of copolymerising with the above mentioned monomers. These replacement monomers include in particular acrylic and/or methacrylic acid esters of alcohols having up to 8 carbon atoms, diesters of alkanediols and α,β-monoethylenically unsaturated monocarboxylic acids such as ethylene glycol diacrylate and butanediol-(1,4)-diacrylate, amides of α,β-monoethylenically unsaturated mono and dicarboxylic acids, such as acrylamide and methacrylamide, and their N-methylol derivatives, and N-alkoxymethyl- and N-acyl-(meth)-acrylamides having 1 to 4 carbon atoms in the alkoxy group, e.g. N-methylol-(meth)acrylamide, N-methoxymethyl-(meth)acrylamide, N-n-butoxymethyl-(meth)-acrylamide and N-acetoxymethyl-(meth)acrylamide. Vinyl esters of carboxylic acids having 1 to 18 carbon atoms may also be used as comonomers, in particular vinyl acetate and vinyl propionate, vinyl chloride and vinylidene chloride, vinyl ethers such as vinyl methyl ether, vinyl ketones such as vinyl ethyl ketone and heterocyclic monovinyl compounds such as vinyl pyridine.

The process according to the invention is carried out at temperatures of at least 75° C. and at pH values of 3 to 6. Suitable emulsifiers for these pH values are those of the sulphate and sulphonate type. Typical representatives include higher fatty alcohol sulphates, higher alkyl sulphonates and alkyl aryl sulphonates and their condensation products with formaldehyde, higher hydroxy alkyl sulphonates, salts of the sulphosuccinic acid esters and sulphated ethylene oxide adducts.

The total quantity of peroxodisulphate used as initiator in the process according to the invention is 0.5 to 1.5 parts by weight, based on the total quantity of monomers. Salts of peroxodisulphuric acid, such as sodium, potassium or ammonium peroxodisulphate, are suitable initiators.

To buffer the reaction mixture, alkali is added to the components initially introduced into the reactor and optionally also to the aqueous stream introduced into the reactor. The following are examples: sodium and potassium hydroxide, sodium and potassium carbonate and sodium and potassium bicarbonate.

The emulsion polymerisation is optionally carried out in the presence of polymerisation auxiliaries such as chelating agents and accelerators. Chain transfer agents may also be used in the polymerisation reaction, e.g. tetrabromo-methane, bromomethyl benzene, alcohols, higher alkyl mercaptans, dialkyl dixanthogenates, thioglycollic acid and their salts and esters. The type and quantity to be used depend inter alia on the activity of the compounds and the quantity of diene used, and would be well known to the expert.

When polymerisation has been terminated after almost complete conversion of the monomers, the latex may be freed from residual monomers in known manner and, to increase its mechanical stability, it may be adjusted to a pH of ca. 7 to 11. The dispersions obtained by the process according to the invention have surface tensions of from 45 to 70, preferably from 50 to 60 mN/m at pH values above 6.0. Their solid content may vary from 1 to 65% by weight and is preferably 30 to 50% by weight. The latices, which are substantially or completely free from coagulate and specks, are suitable inter alia for bonding non-wovens, impregnating and coating textile materials and paper and preparing formulations of paint binders.

The following Examples illustrate the process according to the invention.

EXAMPLE 1

560 g of itaconic acid and 107 g of sodium-4-dodecyl benzene sulphonate (75% active substance) are dissolved in 14 kg of water in a 250 liter vessel equipped with a stirrer. The pH is adjusted to 4–5 with concentrated aqueous ammonia solution. After evacuation of the vessel, 6.96 kg of a homogeneous mixture of 44.94 kg of styrene, 24.5 kg of butadiene and 140 g of tertiary dodecyl mercaptan (stream 1) are introduced into the stirred reaction mixture and, after the emulsion has been heated to 85° C., polymerisation is initiated by a solution of 70 g of sodium peroxodisulphate in 1.4 kg of water. After a reaction time of one hour at 85° C., the remainder of (stream 1) and a solution of 700 g of sodium peroxodisulphate, 187 g of sodium-4-dodecyl benzene sulphonate (75% active substance) and 70 g of tetrasodium-ethylene-diamine-N,N,N',N'-tetraacetate in 52.5 kg of water (stream 2) are introduced at a rate, each for 6 hours, at a polymerisation temperature of 85° C. The reaction mixture is then stirred for 2 hours at 85° C. after inflow of the two streams has been terminated.

The synthetic rubber dispersion obtained has a solid content of 49.2%, an average particle diameter of 200 nm and a pH of 4.8. After adjustment to pH 9 with ammonia, the surface tension is 64 mN/m. At this pH, the latex is found to have excellent mechanical stability and extremely little tendency to foaming.

COMPARISON EXAMPLE 1

Example 1 is repeated but with the itaconic acid replaced by an equal quantity by weight of acrylic acid. Such a large quantity of coagulate is formed that the reaction mixture has to be discarded.

COMPARISON EXAMPLE 2

Example 1 is repeated but with the itaconic acid replaced by an equal quantity by weight of methacrylic acid. The reaction mixture contains even more coagulum than that obtained when using acrylic acid, and must also be discarded.

EXAMPLE 2

280 g of itaconic acid and 187 g of sodium-4-dodecyl benzene sulphonate (75% active substance) are dissolved in 14 kg of water in a 250 liter vessel equipped with a stirrer. The pH is adjusted to 4–5 with concentrated aqueous ammonia solution. After evacuation of the vessel, 6.96 kg of a homogeneous mixture of 45.22 kg of styrene, 24.5 kg of butadiene and 140 g of tertiary dodecyl mercaptan (stream 1) are run into the stirred reaction mixture and, after the emulsion has been heated to 85° C., polymerisation is initiated by a solution of 70 g of sodium peroxodisulphate in 1.4 kg of water. After a reaction time of 1 hour at 85° C., the remainder of stream 1 and a solution of 700 g of sodium peroxodisulphate, 187 g of sodium-4-dodecyl benzene sulphonate (75% active substance) and 70 g of tetrasodium ethylene diamine-N,N,N',N'-tetracetate in 52.5 kg of water (stream 2) are both added at a polymerization temperature of 85° C. for 6 hours. The reaction mixture is then stirred for a further 2 hours at 85° C. after introduction of these streams has been completed.

The synthetic rubber dispersion obtained has a solid content of 50.9%, an average particle diameter of 196 nm and a pH of 3.6. After adjustment to pH 9 with ammonia, the surface tension is 58 mN/m. At this pH, the latex is found to have excellent mechanical stability and extremely little tendency to foaming.

The rubber latices described in Examples 1 and 2 adjusted to an alkaline pH are eminently suitable for the impregnation of needle felt.

EXAMPLE 3

187 g of sodium-4-dodecyl benzene sulphonate (75% active substance) and 140 g of itaconic acid are dissolved in 14 kg of water in a 250 liter vessel equipped with a stirrer. The pH is adjusted to 4–5 with concentrated aqueous ammonia solution. After evacuation of the vessel, 6.96 kg of a homogeneous mixture of 44.94 kg of styrene, 24.5 kg of butadiene and 140 g of tertiary dodecyl mercaptan (stream 1) are run into the stirred reaction mixture and polymerisation is initiated by a solution of 70 g of sodium peroxodisulphate in 1.4 kg of water after the emulsion has been heated to 85° C. After a reaction time of 1 hour at 85° C., the remainder of stream 1 and a solution of 700 g of sodium peroxodisulphate, 187 g of sodium-4-dodecyl benzene sulphonate (75% active substance) and 70 g of tetrasodium-ethylene diamine-N,N,N',N'-tetraacetate in 28 kg of water (stream 2) and a solution of 420 g of itaconic acid in 24.5 kg of water (stream 3) are each added for 6 hours at a polymerisation temperature of 85° C. When all the streams have been run in, the reaction mixture is stirred for 2 hours at 85° C.

The synthetic rubber dispersion obtained has a solid content of 50.1%, an average particle diameter of 237 nm and a pH of 2.1. The surface tension is 58 mN/m at pH 9.

This rubber latex may also be used for the impregnation of needle felts.

EXAMPLE 4

420 g of itaconic acid, 140 g of sodium bicarbonate and 70 g of sodium lauryl sulphate are dissolved in 17.5 kg of water in a 250 liter vessel equipped with a stirrer. After evacuation of the vessel, 10.45 kg of a homogeneous mixture of 38.5 kg of butadiene, 20.85 kg of styrene, 10.5 kg of acrylonitrile and 70 g of tertiary dodecyl mercaptan (stream 1) are run into the stirred reaction mixture and, after the emulsion has been heated to 80° C., polymerisation is initiated by a solution of 140 g of ammonium peroxodisulphate in 1.4 kg of water. After a reaction time of 30 minutes at 80° C., the remainder of stream 1 is added over a period of 7 hours and an aqueous solution of 560 g of ammonium peroxodisulphate, 210 g of sodium lauryl sulphate and 140 g of sodium bicarbonate in 49 kg of water (stream 2) over a period during 8 hours at a polymerisation temperature of 80° C. When the addition of these streams has been completed, the reaction mixture is stirred for a further 2 hours at 80° C.

A synthetic rubber dispersion having a solid content of 51.0%, an average particle diameter of 288 nm and a pH of 6.0 is obtained. The surface tension at pH 9 is 48 mN/m.

This rubber latex may be used for impregnating cellulose board.

EXAMPLE 5

700 g of itaconic acid and 187 g of sodium-4-dodecyl benzene sulphonate (75% active substance) are dissolved in 14 kg of water in a 250 liter vessel equipped with a stirrer. The pH is adjusted to 4–5 with concentrated aqueous ammonia solution. After evacuation of the vessel, 6.74 kg of a homogeneous mixture of 42.0 kg of styrene, 25.2 kg of butadiene and 210 g of tertiary dodecyl mercaptan (stream 1) and 350 g of a 60% aqueous solution of N-methylolacrylamide are run into the stirred reaction mixture and, after the emulsion has been heated to 80° C., polymerisation is initiated by a solution of 140 g of ammonium peroxodisulphate in 1.4 kg of water. The temperature of the reaction mixture is raised to 85° C. after 15 minutes, and the remainder of stream 1, a solution of 840 g of ammonium peroxodisulphate, 187 g of sodium-4-dodecyl benzene sulphonate (75% active substance) and 70 g of tetrasodium-ethylene diamine-N,N,N',N'-tetraacetate in 70 kg of water (stream 2) and 3.15 kg of a 60% aqueous solution of N-methylolacrylamide (stream 3) are each added over a period of 6 hours at a polymerisation temperature of 85° C. The reaction mixture is stirred for 2 hours at 85° C. after the feedings have been completed.

A synthetic rubber dispersion having a solid content of 44.0%, an average particle diameter of 258 nm and a pH of 4.4 is obtained. The surface tension at pH 7 is 48 mN/m.

This rubber latex is suitable for bonding non-wovens.

We claim:

1. Process for the preparation of aqueous synthetic rubber dispersions by emulsion polymerization of from 0.3 to 1.0% by weight of itaconic acid and 99.0 to 99.7% by weight of a mixture of from 10 to 90% by weight of butadiene, 10 to 90% by weight of styrene, 0 to 50% by weight of (meth)acrylonitrile and 0 to 25% by weight of N-methylol-(meth)-acrylamide and N-methoxymethyl-(meth)acrylamide in the presence of from 0.05 to 0.5% by weight, based on the copolymer, of an emulsifier consisting of the sulphate or sulphonate type comprising introducing part of the water, part or all of the itaconic acid, all or part of the emulsifier and part of the other monomers into a reactor equipped with a stirrer, adjusting the pH to 3.5 to 6 by addition of a base, initiating the polymerization at a temperature of at least 70° C. by addition of part of 0.5 to 1.5% by weight, based on the total quantity of monomers, of an ammonium peroxodisulphate and/or an alkali metal peroxodisulphate and adding at least one non-aqueous stream of the remaining monomers, and at least one aqueous stream containing the remainder of the peroxodisulphate while maintaining a temperature of the reactor of 75° to 150° C. until the monomers have undergone almost complete conversion.

* * * * *